(12) United States Patent
Hall et al.

(10) Patent No.: US 10,657,972 B2
(45) Date of Patent: May 19, 2020

(54) METHOD OF TRANSLATING AND SYNTHESIZING A FOREIGN LANGUAGE

(71) Applicants: Max T. Hall, Bradenton, FL (US); Edwin J. Sarver, Cookesville, TN (US)

(72) Inventors: Max T. Hall, Bradenton, FL (US); Edwin J. Sarver, Cookesville, TN (US)

( * ) Notice: Subject to any disclaimer, the term of this patent is extended or adjusted under 35 U.S.C. 154(b) by 154 days.

(21) Appl. No.: 16/053,922

(22) Filed: Aug. 3, 2018

(65) Prior Publication Data

US 2019/0244623 A1   Aug. 8, 2019

Related U.S. Application Data

(60) Provisional application No. 62/625,371, filed on Feb. 2, 2018.

(51) Int. Cl.
| | | |
|---|---|---|
| *G10L 15/00* | (2013.01) | |
| *G06T 15/00* | (2011.01) | |
| *G06T 13/40* | (2011.01) | |
| *G06F 40/58* | (2020.01) | |
| *G06F 40/221* | (2020.01) | |
| *G10L 13/033* | (2013.01) | |
| *H04N 21/234* | (2011.01) | |
| *G10L 13/08* | (2013.01) | |

(Continued)

(52) U.S. Cl.
CPC ............ *G10L 17/26* (2013.01); *G06F 40/221* (2020.01); *G06F 40/58* (2020.01); *G06T 13/40* (2013.01); *G06T 15/00* (2013.01); *G10L 15/005* (2013.01); *G10L 19/02* (2013.01); *G10L 13/033* (2013.01); *G10L 13/08* (2013.01); *G10L 15/26* (2013.01); *G10L 2021/105* (2013.01); *H04N 21/2335* (2013.01); *H04N 21/23418* (2013.01); *H04N 21/23424* (2013.01); *H04N 21/439* (2013.01)

(58) Field of Classification Search
CPC ......... G10L 15/00; G10L 15/26; G10L 13/08; G06T 13/00; G06T 13/40; G06T 15/00; G06T 2207/30201; H04N 21/23418; H04N 21/23424; H04N 21/439
See application file for complete search history.

(56) References Cited

U.S. PATENT DOCUMENTS 5,826,234 A * 10/1998 Lyberg .................... G06F 40/58
704/277
6,697,120 B1 * 2/2004 Haisma ................. G06T 13/205
345/473

(Continued)

*Primary Examiner* — Paras D Shah
(74) *Attorney, Agent, or Firm* — McHale & Slavin, P.A.

(57) ABSTRACT

A method to interactively convert a source language video/audio stream into one or more target languages in high definition video format using a computer. The spoken words in the converted language are synchronized with synthesized movements of a rendered mouth. Original audio and video streams from pre-recorded or live sermons are synthesized into another language with the original emotional and tonal characteristics. The original sermon could be in any language and be translated into any other language. The mouth and jaw are digitally rendered with viseme and phoneme morphing targets that are pre-generated for lip synching with the synthesized target language audio. Each video image frame has the simulated lips and jaw inserted over the original. The new audio and video image then encoded and uploaded for internee viewing or recording to a storage medium.

22 Claims, 8 Drawing Sheets

Source image region

Rendered image to be composited

(51) Int. Cl.
  *G10L 21/10* (2013.01)
  *H04N 21/439* (2011.01)
  *H04N 21/233* (2011.01)
  *G10L 15/26* (2006.01)
  *G10L 17/26* (2013.01)
  *G10L 19/02* (2013.01)

(56) References Cited

U.S. PATENT DOCUMENTS

| | | | |
|---|---|---|---|
| 10,276,149 B1* | 4/2019 | Liang | G10L 13/033 |
| 2004/0068410 A1* | 4/2004 | Mohamed | G10L 21/06 |
| | | | 704/276 |
| 2006/0136226 A1* | 6/2006 | Emam | H04N 5/222 |
| | | | 704/277 |
| 2006/0285654 A1* | 12/2006 | Nesvadba | G10L 15/26 |
| | | | 379/67.1 |
| 2010/0082345 A1* | 4/2010 | Wang | G06T 13/205 |
| | | | 704/260 |
| 2011/0227931 A1* | 9/2011 | Lu | G06T 13/205 |
| | | | 345/473 |
| 2011/0305384 A1* | 12/2011 | Aoyama | G06K 9/00281 |
| | | | 382/159 |
| 2014/0372100 A1* | 12/2014 | Jeong | G06F 40/58 |
| | | | 704/2 |
| 2015/0056580 A1* | 2/2015 | Kang | G10L 25/51 |
| | | | 434/157 |
| 2016/0021334 A1* | 1/2016 | Rossano | G10L 13/08 |
| | | | 704/2 |
| 2016/0098395 A1* | 4/2016 | DuBose | G10L 15/26 |
| | | | 704/2 |
| 2017/0040017 A1* | 2/2017 | Matthews | G10L 25/57 |
| 2017/0270701 A1* | 9/2017 | Okaniwa | G06F 40/268 |
| 2017/0286759 A1* | 10/2017 | Yao | G06K 9/00308 |
| 2017/0345201 A1* | 11/2017 | Lin | G10L 21/10 |

* cited by examiner

Source image region

Rendered image to be composited

METHOD OF TRANSLATING AND SYNTHESIZING A FOREIGN LANGUAGE

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/625,371, entitled "METHOD OF TRANSLATING AND SYNTHESIZING A FOREIGN LANGUAGE", filed Feb. 2, 2018. The contents of which the above referenced application is incorporated herein by reference.

FIELD OF THE INVENTION

This invention is directed to the field of language translation and in particular to a method of translating and synthesizing a foreign language with the original emotional and tonal characteristics.

BACKGROUND OF THE INVENTION

Language consists of words, either spoken or written, as the basis for all communication. The spoken word will include emotional and tonal characteristics. Such characteristics can easily change the meaning of a word. For this reason the importance of translating from one language to another must take into account certain extrinsic characteristics of the speaker if the communication is to be effective. For instance, the word "project" can be used as noun to define something planned, or used as a verb to plan something. Sermons are especially venerable to translations for the emotional and tonal characteristics used are critical to the meaning of the words.

What is lacking in the art a method to interactively convert a source language video/audio stream into one or more target languages wherein the spoken words in the converted language are synchronized with synthesized movements of a digitally rendered mouth. The rendered mouth to include viseme and phoneme morphing targets that are pre-generated for lip synching with the synthesized target language audio.

SUMMARY OF THE INVENTION

The instant invention automatically or interactively converts a source language video/audio stream into one or more target languages in full high definition (HD) video format. The spoken words in the converted language are synchronized with synthesized movements of a rendered mouth. The method disclosed teaches the ability to post process previously recorded or archived video as well as streaming real-time video from one or more commercial grade HD cameras.

An objective of the invention is the ability to take the original audio and video stream from a pre-recorded or live sermon and remaster the source (for example, English) language to a synthesized foreign language with the original emotional and tonal characteristics. Likewise, the original sermon could be in any language and be translated into any other language. The mouth and jaw are digitally rendered with viseme and phoneme morphing targets that are pre-generated, for example using a commercially available rendering program such as 3ds Max, for lip synching with the synthesized target language audio. Each video image frame has the simulated lips and jaw inserted over the original. The new audio and video image is then encoded and uploaded for internet viewing or recording to a storage medium such as a DVD. In the following, we refer to the original language as the source language and the language into which it is translated as the target language. Likewise, we refer to the original image stream as the source image stream and the image stream which has the synthesized mouth movements as the target image stream.

Another objective of the invention is to update a texture map prior to translating an original video.

Still another objective of the invention is update a 3D mesh using a graphic artist to manually edit the 3D mesh to fit the facial structure based on the captured speech video.

Still another objective of the invention is rescan a speaker's face to capture a 3D mesh by use of a 3D laser range finder approach.

Other objectives and further advantages and benefits associated with this invention will be apparent to those skilled in the art from the description, examples and claims which follow.

DETAILED DESCRIPTION OF THE PREFERRED EMBODIMENT

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
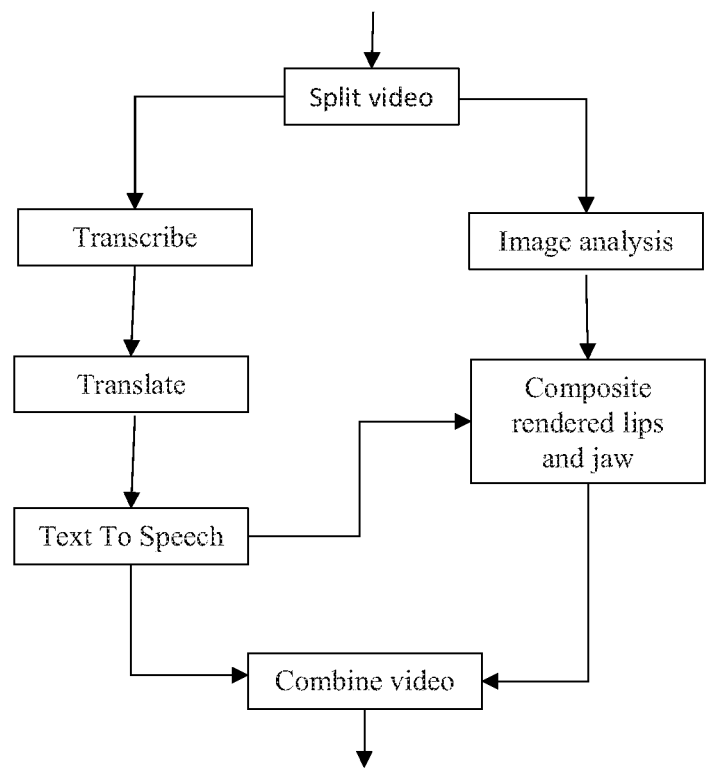
FIG. 1 is a flow diagram of the split video steps.

Referring now to FIG. 1, set forth is an overview of the method for translating and synthesizing a foreign language with the original emotional and tonal characteristics comprising the steps of:

1. Separate the source video into independent source language audio and source image streams.
2. Perform transcription on an isolated block of source language audio to generate source language text, for example with a Speech Recognition Server (SRS). In addition,
   a. Detect the duration of the word spoken.
   b. Detect the volume of the word spoken.
   c. Detect the spectral characteristics of each word.
   d. Use the source image stream of the speaker's mouth in synchronization with the source audio to increase the reliability of the source audio to source text transcription.
3. Translate the source language text received from the SRS into the selected target language, for example, by retrieving the target language text from Google Translator.

4. Generate the synthetic target language audio from the translated target language text file created in #3:
   a. Create an XML SML (synthetic markup language) string using input parameters from the output described in #2 coupled with the target language text.
   b. Import the target XML string to the Synthetic Foreign Language (SFL) speech engine to generate the desired target language audio stream file.
5. For each source stream image, perform the following tasks:
   a. Identify all the faces within the image and authenticate the key speaker.
   b. If the speaker's face is detected, measure the size of the face.
   c. When the speaker is found in the current frame and the size of the speaker's face is large enough, perform facial landmark detection defining the location and orientation of the lips and lower jaw line with sub-pixel precision.
   d. Extract a color contour which defines the region to be replaced by the rendered jaw so that seamless compositing of the rendering can be performed regardless of local illumination sources.
6. Using the target language audio file (#4) and facial coordinates (#5) perform the following:
   a. Import the target language audio file and generate the morphological lip, tongue, teeth, and jaw synchronization movements.
   b. Seamlessly combine a rendering of the mouth and lower jaw with the source image sequence, matching the facial mesh coordinates from #5, matching scale and orientation of the speaker for every video frame. This seamless compositing makes use of the extracted color contour from #5.
7. Encode the new target audio and target image streams back onto a single target video stream.

Figure 2:
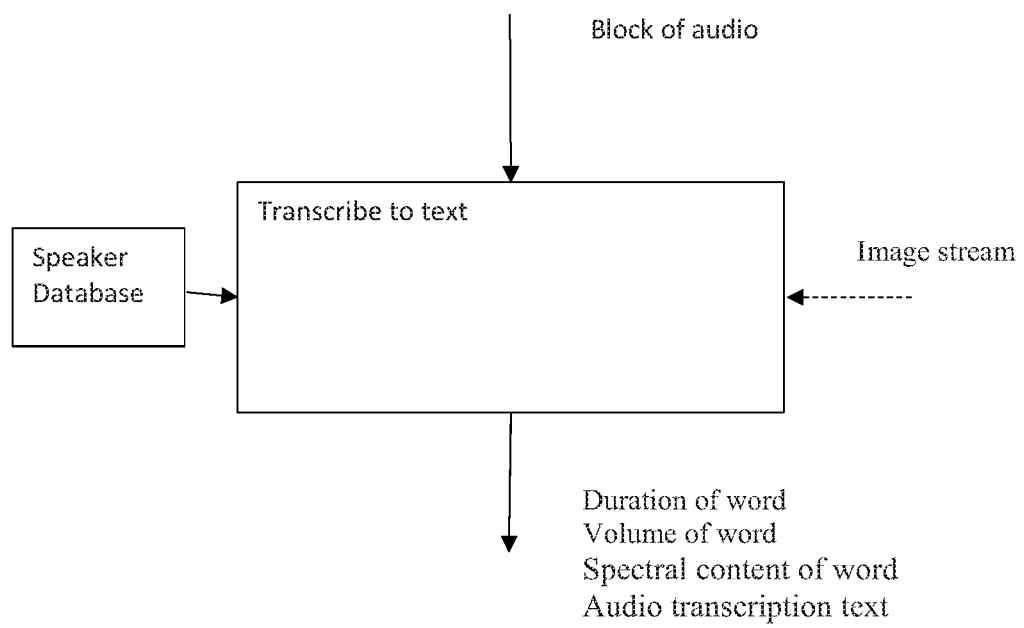
FIG. 2 is a flow diagram of the combining video steps.

Referring to the figures in general, the following is a detailed description of each of the steps of the instant invention. The method requires the separation of the input video stream into independent audio and image streams. The input video could be either a pre-recorded or a real-time video stream. The real-time stream includes live AV feeds, internet streams, or other means. The format for the input could be any standard or custom means of encoding a video stream, for example: 3GP, ASF (Advanced Streaming Format), ADTS (Audio Data Transport Stream), AVI, MP3, MPEG-4, SAMI (Synchronized Accessible media Interchange)) or other AV format. The output audio stream could be in any convenient format to facilitate further processing, for example this could be: Adaptive Differential Pulse Code Modulation, MP3, Windows Media Audio or other audio format. The output image stream could be in any convenient format such as a sequence of images, a DV Video, H.264, MPEG-4, Widows Media Video, or other video format. The separated audio and image streams could be held in memory for further immediate processing or written to a mass storage device for batch or later processing, The audio transcription procedure, illustrated in FIG. 2 requires that the audio is extracted and then analyzed by a speech recognition software application. The lexicon database will have been pre-trained with the source to be transcribed. An N second block of audio is transferred to the speech recognition engine. Callback functions are set to retrieve word start positions in milliseconds within the audio block. Error status updates for failures, such as words pronounced too slow or fast, are set to initiate a recovery when possible. In the case of errors of low confidence in the translation of words, the original audio is passed to the output target. This can be for things like animal sounds the speaker may make.

Figure 3:
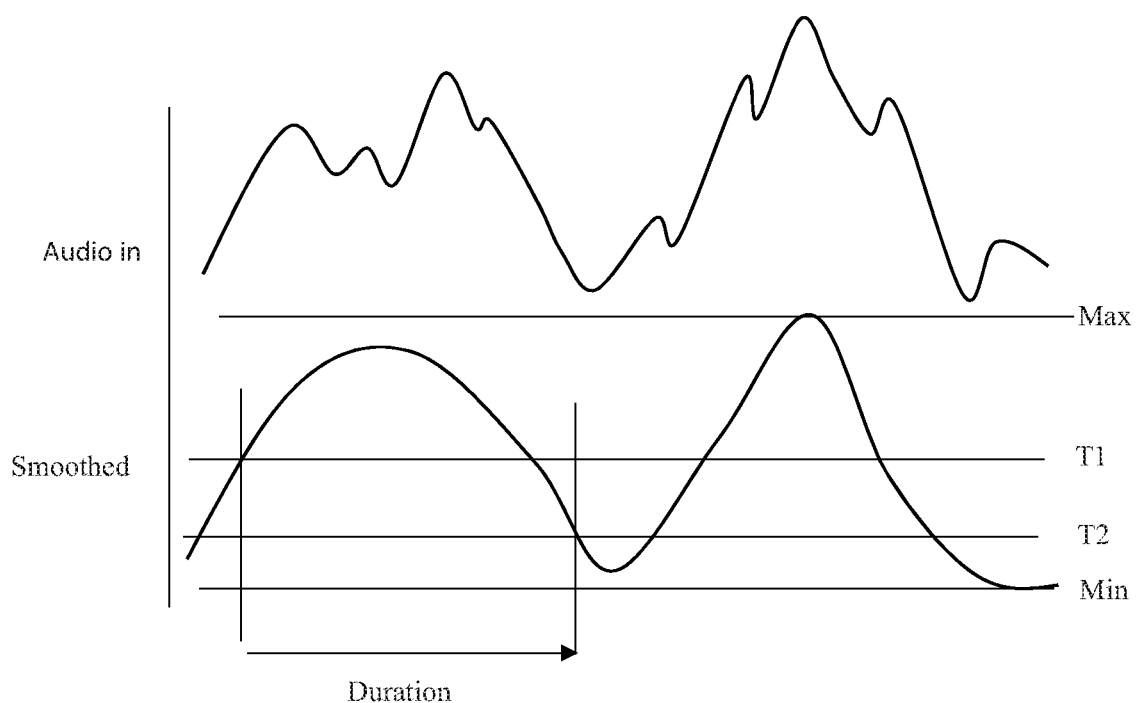
FIG. 3 is a chart depicting audio smoothing versus time.

The duration of each word or syllable is determined by evaluation of an isolated audio waveform. To extract the duration we perform the following steps:
   Low pass filter the waveform with a moving average finite impulse response filter
   Determine the maximum and the minimum values in the audio segment
   Set a threshold T1 based on the maximum and minimum values
   Find the first occurrence of a sample greater than the threshold as the starting point
   Set a second threshold T2 based on the maximum and minimum values
   Find the next occurrence of a sample less than the second threshold as the ending point
   The duration is the corresponding time of the ending point minus the starting point This process is continued for the rest of the audio signal. If two durations are close to each other they are combined into a single word. Knowing the duration of the word is required for the synthetic word or words translated in the foreign language to be generated over the same time span, as depicted in FIG. 3.

Figure 4:
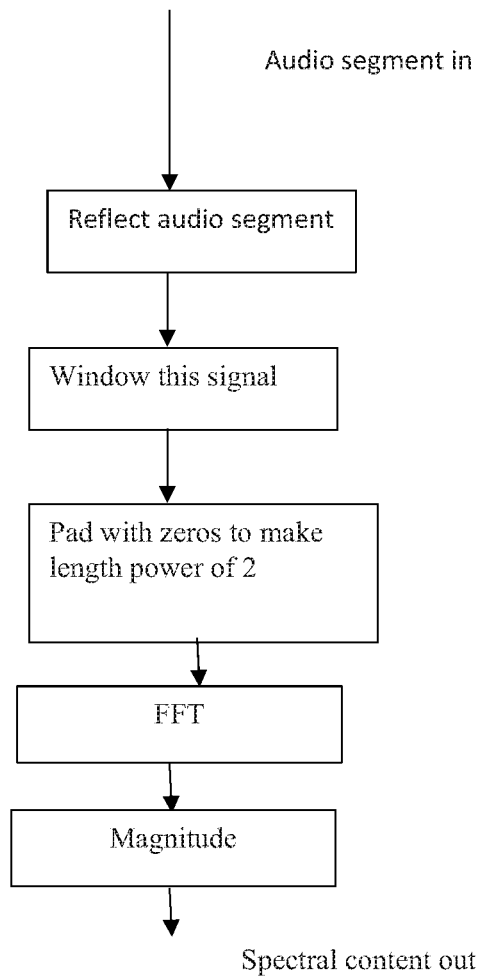
FIG. 4 is a flow diagram of the audio segmenting.

Fourier analysis is used to determine the spectral characteristics of the word, as illustrated in FIG. 4. To perform spectral analysis on the audio segment, we perform short time Fourier transform techniques followed by computation of the magnitude of the complex FFT output. This spectral analysis allows us to identify the "pitch" of the word as well as the peak frequency, while the other spectral components allows us to match speakers overall tone. The pitch is applied to the synthetic text to speech target word complement via SML.

The volume or amplitude for each word is simply found as the mean value of the audio segment. This is applied to its synthetic text to speech target word complement via SML. The transcribed source language text is easily translated into the target language text via simple database lookup. An example of this is the Google translate API. This translation includes the ability to track how one or more source language words correspond to one or more target language words. Knowing if a word generates multiple words is important, in that change to the duration, pitch and volume applies to them all.

The target language text is converted into the target language audio using a text to speech engine. This can take the form of a library of stored audio segments representing specific words. For example, the synthetic markup language (SNL) allows for the specification of duration, pitch, volume, and the target language word. This SML can then be passed to one of several commercially available text to speech processors. As required during real-time processing, the target language speed is adjusted to keep the target image sequence time locked with the source image sequence.

Figure 5:
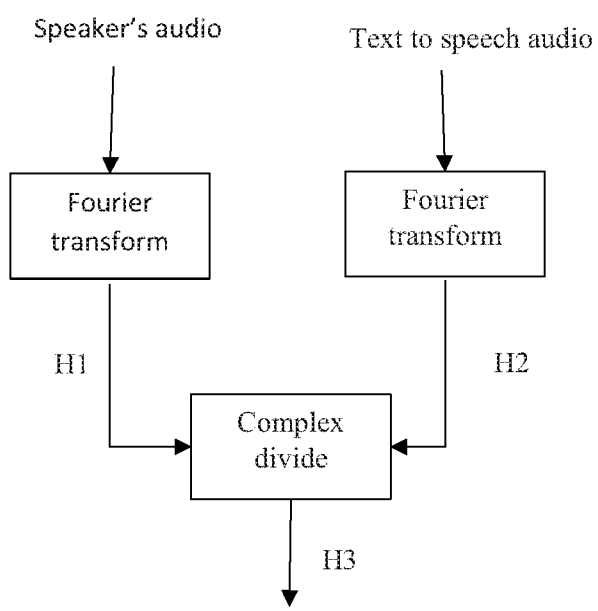
FIG. 5 is a flow diagram of the speaker and text input.

The speaker has a natural spectral response while the synthesized target language speech engine has its own spectral response. Our goal is to have the synthesized audio spectral response match the speaker spectral response. To do this we generate a custom filter transform the synthesized audio spectral response into one that matches the speaker's. This speaker matching filter is for a specific speaker using a specific text to target language speech engine. The design of the filter has the following steps, and depicted in FIG. 5.

Perform a Fourier transform H1 on a segment of the speaker's source language audio Perform a Fourier transform H2 on a segment of the target language speech engine's audio Divide the complex Fourier transforms H1/H2 to yield the desired filter's frequency response H3

Find either time domain representation h3[n] of the filter frequency response or filter in the frequency domain using the frequency response H3

Details of this processing are known to those skilled in the art, such as windowing the speech segment prior to Fourier transforming and adding a check to the complex division to prevent division by zero. Likewise, converting the filter frequency response H3 to either a recursive or non-recursive time domain filter is known to those skilled in the art of digital signal processing, as is performing the filter in the frequency domain. This filter is then used after the text to speech engine outputs the target audio to better match the source speaker's characteristics. The filter design is performed in two ways: adapted and adaptive.

The ability to switch between adaptive and adapted filters is a user interface option provided to the operator during real-time or off-line processing of video streams.

The adapted filters are designed prior to their use based on stored audio for both the speaker and the target language text to speech engine. The adapted filters are used at the start of a video conversion. The adaptive filters are designed in real time using current samples of the source audio and the text to speech audio output. The adaptive filters are used when it is not practical to obtain either the source audio or the text to target speech audio output prior to the use of the filter.

For each source image, the identification of the speaker's face and detection of the location of facial landmarks must be performed. The location of faces in an image is a basic image processing task known to those skilled in the art of image processing. Further, given a set of speaker face enrollment images, a particular face can be identified as belonging to the speaker also using basic facial biometric techniques. Once a face has been identified as being the speaker's face, it is a simple matter to measure the face's size in pixels. If the face is greater than some pre-set value (15 pixels high the preferred embodiment), then identification of specific landmarks is performed so that a rendered mouth and jaw can be composited with the source image sequence. These landmarks are located using a combination of local matched filters and overall constellation matching algorithms known to those skilled in the art. Along with the location of the facial landmarks, a color contour is extracted which defines the region to be replaced by the rendered jaw so that seamless compositing of the rendering can be performed regardless of local illumination sources or a current variation the speakers appearance (such as a sun tan).

Based upon location of facial features, a set of coordinates are generated for rendering the synthesized lips and jaw for the final overlay on the original image. The facial features are only detected if there are a significant number of pixels that represent the mouth and jaw areas. In cases where there are only a few pixels, the original image is not required to be modified by compositing with the rendered mouth and jaw model.

When the mouth and jaw are of sufficient size, in addition to the feature locations being detected, a bounding color contour around the mouth and jaw features are extracted. This contour is used to ensure a smooth compositing of the rendered mouth and jaw with the original image.

The target image stream has a synthesized rendering of the speaker's mouth and jaw composited on the speaker's face, apparently synchronized with the target language audio. The following steps are performed for these tasks. The first step in animating the speaker's mouth and jaw, is to get a high resolution 3D scan performed on them, giving a realistic high polygon count mesh with an ultra-high resolution skin texture map. This can be performed at any commercial studio set up for this purpose.

Given the target language audio, the positions of the lips, teeth, tongue, and jaw are calculated using software modules commercially available for this purpose. These positions are then time synchronized with the source images to perform this rendering and compositing to generate the target image stream. This rendering also includes the mapping provided by the facial feature locations.

Figure 6:
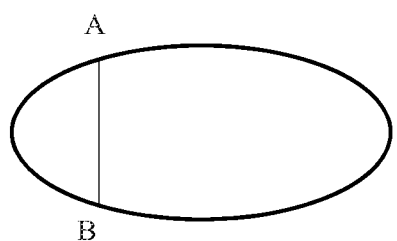
FIG. 6 is a depiction of source image region and rendered image to be composited.
Figure 6:
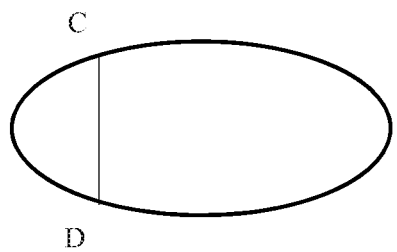

As stated above, the compositing of the rendered mouth and jaw employs a high resolution texture map. The rendered image is adapted to the source image local neighborhood prior to compositing to prevent color discontinuity artifacts at the boundary of the contour area. This adjustment is made to eliminate the boundary artifact using a linear function to adjust the rendered mouth and jaw image color pixels. This adjustment is performed using one column of pixels at a time in the region of the face to be composited. This process illustrated in FIG. 6 and described below:

For a given column in the source image and the rendered image to be composited, color pixel values at the top and bottom of the columns are found. In FIG. 6, these are referred to as pixels A and E for the source image and C and D for the rendered image.

A linear transformation is found, $x(t)=y(t)+a*t+b$, so that the top and bottom pixels in the rendered image match those of the source image.

The linear transformation is applied to all pixels in the column in the rendered image This is applied to each column in the source and rendered image region.

Then the rendered image is composited onto the source image to make the target image In the linear transformation, $x(t)=y(t)+a*t+b$, for $t=0$ to 1 corresponding to the top and bottom of the image column being processed. In this equation, y(t) is a color pixel value from the rendered image column x(t) is a color pixel value for the final composited image column $b=A-C$ $a=B-D-b$ There are times when the profile of the speaker's face is visible. At these times, a background segment is visible below the speaker's jaw. As the speaker talks, the jaw moves up and down and the background segment below the jaw will change. As the translated audio and synthesized mouth and jaw image are generated, the synthesized jaw will be unsynchronized with the original source image sequence. During the times where the source image has the jaw extended below the rendered jaw line, a section of background image is composited below the synthesized jaw (so the source image jaw line is not seen!). This section of background image is obtained from source image frames immediately before and/or after the current source frame. The compositing of the background section makes use of local image correlation to ensure a smooth blending of the background section with the current synthesized mouth and jaw and with the rest of the source image.

Figure 7:
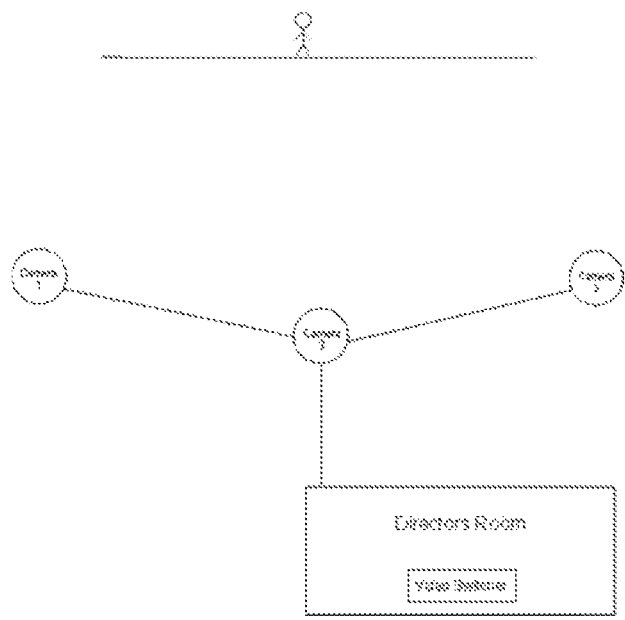
FIG. 7 is a pictorial depicting camera placement in relation to a speaker.

Real time video switcher information is used in discriminating which camera is active, its current magnification and aperture setting to determine if the speaker should be identified for video image processing or audio translation only. A cyclic buffer of 10 seconds for each camera is stored for use when a new camera angle is selected by the director and background rendering around the speakers jawline would produce artifacts or remnants of the speakers true jaw being seen after the overlay has been placed on the original image. This buffered image data allows us to reconstruct an artificial background around the speaker's jawline when it is needed. This process is illustrated in FIG. 7.

Figure 8:
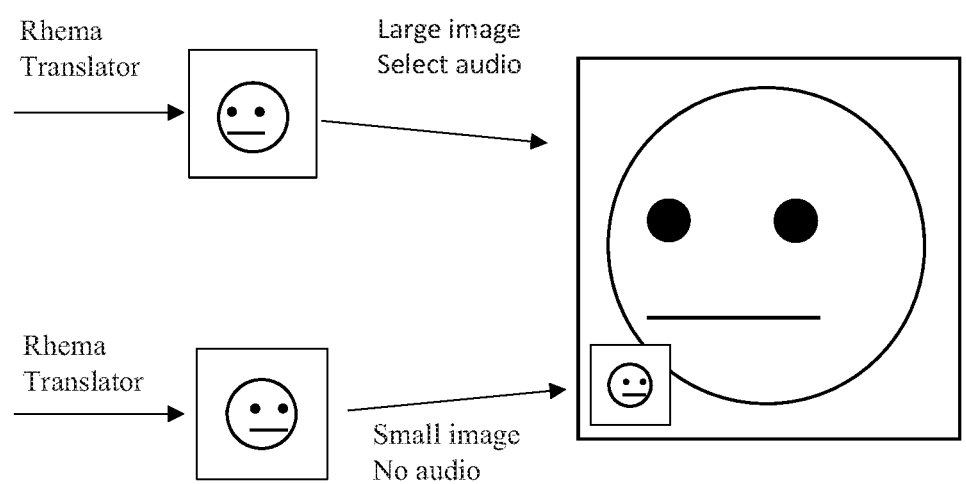
FIG. 8 is a depiction of the translator for large and small images.

When the video translation calls for picture in picture capability, the translation methods above are applied in parallel. In this case, there is a final compositing operation where a selected video stream is placed inside a larger video stream and one of the audio streams is selected for the final target video. This is illustrated in FIG. 8.

Combine target language audio and the target image streams in the final target video stream.

Over short time periods the appearance of the speaker's face and the captured texture map can significantly diverge. For example, the speaker may get a sunburn, suntan, facial injury, altered makeup, altered facial hair, or the ambient lighting may significantly change. In these cases, it would be advantageous to update the texture map prior to translating the original video. This update is accomplished by having the speaker perform a simple routine of slowly looking left, then right, then up, and then down. This routine can be performed while the speaker is talking and can be done at the beginning and/or at the end of the recorded speech. We use this to sequence to extract a current texture map to be used in processing the speech in which the texture map was extracted from.

Over longer time periods the speaker's facial structure (3D mesh) can also change. For example, the speaker may lose or gain weight, may undergo surgery, or may have an injury. In this case, the 3D mesh can be updated using a graphical artist to manually edit the 3D mesh to better fit the current speaker's facial structure based on the captured speech video. In extreme cases, it may be required to rescan the speaker's face to capture the 3D mesh. The rescanning can be performed, for example, using a 3D laser range finder approach.

The methods generates a target language video from a source language video for a religious sermon where the source language video is split into audio and image streams, the source language audio is translated into a target language audio stream, the source image stream has a rendering of the speaker's mouth operating in synchrony with the target language audio stream and composited on the source image stream, and combining the result into a target language video. This applies to off-line batch processing of an existing video of a sermon. This applies to real-time processing of a live video sermon. This is performed with a fixed time delay of 10 seconds.

In an embodiment the target language audio stream has the lips and jaw moving in synchrony with the target language audio. The compositing of the rendered mouth and jaw onto the original source image makes use of a linear matching function to prevent objectionable color discontinuity artifacts. The synthesized target audio spectral characteristics matches the speakers spectral characteristics via use of a pre-calculated filter based on spectral characteristics of the speech engine and the spectral characteristics of the speaker. The synthesized target audio spectral characteristics matches the speakers spectral characteristics via use of a pre-calculated filter based on spectral characteristics of the speech engine and the spectral characteristics of the speaker and a filter that is calculated in real time. The speaker dependent audio filter can be very responsive, dependent upon an update constant that is set up for a given speaker and application.

In a preferred embodiment, batch data is used to optimize real-time modes: Combination of images and audio to enhance audio translation; Optimize detection and recognition of audio and image features.

Use of video switches information controlled by the director to optimize processing of audio and video streams. In particular, a 10 second video buffer for each camera is maintained so that when a different camera is switched in, background image data around the speaker's jaw is available when needed to prevent compositing artifacts. Use of original video with updated audio only: when the image does not contain the speaker; when the image too small; when the tracking of registration features is deemed to be unreliable.

Use of hysteresis in determining when to composite the rendered mouth and jaw onto the source image. Blending function to blend between the original image and the rendered mouth and jaw. Blending in/blending out. When the speaker says non-translatable words (for example, animal sounds), the motion the lips source image is used to specify the motion in the rendered image. In this instance, the corresponding segment of source audio is used with this image sequence. The use of the above techniques are applied in parallel when a picture-in-picture mode is generated.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of translating and synthesizing a foreign language with original emotional and tonal characteristics using a computer comprising the steps of:

separating a source video into independent source language audio and source image streams;

performing a transcription on an isolated block of said source language audio to generate a source language text;

translating said source language text into a selected target language and forming a target language text file;

generating a synthetic target language audio from said target language text file;

creating a synthetic markup language string using input parameters from said source language text coupled with said target language text file;

converting said synthetic markup language string into a target language audio stream file;
collecting data from said independent source language audio and source image stream, wherein the collecting comprises identification of a key speaker's face, measurement of the face, facial landmark detection comprising: lips and jawline orientation, and a color contour;
importing said target language audio stream file;
generate a morphological lip, tongue, teeth, and jaw synchronization movement file based on said target language audio stream file;
synchronizing the morphological lip, tongue, teeth, and jaw synchronization movement file with the collected data to generate a rendered and composited target image stream, wherein the compositing comprises using each column of color pixel values of the source image, performing a linear transformation on the pixels in each of the columns to yield a target image stream;
encoding the target language audio stream file and the target image stream onto a single target video stream.

2. The method of translating and synthesizing a foreign language according to claim 1 wherein said step of performing a transcription on an isolated block of source language audio to generate source language text includes the step of detecting the duration and volume of each word spoken.

3. The method of translating and synthesizing a foreign language according to claim 1 wherein said step of performing a transcription on an isolated block of source language audio to generate source language text includes the step of detecting the spectral characteristics of each word spoken.

4. The method of translating and synthesizing a foreign language according to claim 1 wherein said step of performing a transcription on an isolated block of source language audio to generate source language text includes the step of using the a source image stream of the speaker's mouth in synchronization with a source audio to increase the reliability of the source audio to source text transcription.

5. The method of translating and synthesizing a foreign language according to claim 1 wherein said step of converting the synthetic markup language string into a desired target language audio stream file is by use of a synthetic foreign language speech engine.

6. The method of translating and synthesizing a foreign language according to claim 1 where said step of collecting data from each source stream image includes the step of identifying all the faces within the image and authenticating the speaker.

7. The method of translating and synthesizing a foreign language according to claim 6 wherein upon the detection of a speakers face, the size of the speaker face is measured and a facial landmark detection is performed to define the location and orientation of lips and lower jaw line using sub-pixel precision.

8. A method of translating and synthesizing a religious sermon into a foreign language comprising the steps of:
separating a source video of the religious sermon into independent source language audio and source image streams;
performing a transcription on an isolated block of source language audio to generate a source language text;
translating said source language text into a selected target language and forming a target language text file;
generating a synthetic target language audio from said target language text file;
creating a synthetic markup language string using input parameters from said source language text coupled with said target language text file;
converting said synthetic markup language string into a target language audio stream file;
collecting data from said independent source language audio and source image stream, wherein the collecting comprises identification of a key speaker's face, measurement of the face, facial landmark detection comprising lips and jawline orientation, and a color contour;
importing said target language audio stream file;
generate a morphological lip, tongue, teeth, and jaw synchronization movement file based on said target language audio stream file;
synchronizing the morphological lip, tongue, teeth, and jaw synchronization movement file with the collected data to generate a rendered and composited target image stream, wherein the compositing comprises using each column of color pixel values of the source image, performing a linear transformation on the pixels in each of the columns to yield a target image stream;
encoding the target language audio stream file and the target image stream onto a single target video stream.

9. The method of translating and synthesizing according to claim 8 wherein said source video applies to off-line batch processing of an existing video of a sermon.

10. The method of translating and synthesizing according to claim 8 wherein said source video applies to real-time processing of a live video sermon.

11. The method of translating and synthesizing according to claim 10 wherein said live video sermon is performed with a time delay of about 10 seconds.

12. The method of translating and synthesizing according to claim 8 wherein said speaker's mouth lips and jaw move in synchrony with the target language audio.

13. The method of translating and synthesizing according to claim 8 wherein the original source image makes use of said speaker's mouth and jaw onto linear matching function to prevent objectionable color discontinuity artifacts.

14. The method of translating and synthesizing according to claim 8 wherein synthesized target audio spectral characteristics matches the speakers spectral characteristics via use of a pre-calculated filter based on spectral characteristics of a speech engine and the spectral characteristics of the speaker.

15. The method of translating and synthesizing according to claim 8 wherein synthesized target audio spectral characteristics matches the speakers spectral characteristics via use of a pre-calculated filter based on spectral characteristics of a speech engine and the spectral characteristics of the speaker and a filter that is calculated in real time.

16. The method of translating and synthesizing according to claim 8 wherein a speaker dependent audio filter is responsive and dependent upon an update constant.

17. The method of translating and synthesizing according to claim 8 wherein batch data files are optimized in real-time modes, wherein the combination of images and audio enhance audio translation, and optimize detection and recognition of audio and image features.

18. The method of translating and synthesizing according to claim 8 wherein a video switches information is controlled to optimize and processing audio and video streams whereby a 10 second video buffer for each camera used to obtain a video image to provide background image data around a speaker's jaw to prevent compositing artifacts.

19. The method of translating and synthesizing according to claim 8 wherein hysteresis is used in determining when to composite a rendered mouth and jaw onto the source image.

20. The method of translating and synthesizing according to claim 8 including the step of blending between the original image and the rendered mouth and jaw.

21. The method of translating and synthesizing according to claim 8 wherein a corresponding segment of source audio is used when a speaker says non-translatable words.

22. The method of translating and synthesizing according to claim 8 wherein said steps are applied in parallel when a picture-in-picture mode is generated.

\* \* \* \* \*